United States Patent
Saltsgaver et al.

(10) Patent No.: US 11,044,156 B2
(45) Date of Patent: Jun. 22, 2021

(54) SECURE MECHANISM TO MANAGE NETWORK DEVICE CONFIGURATION AND AUDIT WITH A BLOCKCHAIN

(71) Applicant: Cisco Technology, Inc., San Jose, CA (US)

(72) Inventors: Scott M. Saltsgaver, Apex, NC (US); Santosh Ramrao Patil, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 6 days.

(21) Appl. No.: 16/112,418

(22) Filed: Aug. 24, 2018

(65) Prior Publication Data
US 2020/0067774 A1    Feb. 27, 2020

(51) Int. Cl.
*H04L 12/24* (2006.01)
*H04L 29/06* (2006.01)
*H04L 9/32* (2006.01)

(52) U.S. Cl.
CPC ...... *H04L 41/0846* (2013.01); *H04L 63/0823* (2013.01); *H04L 9/3247* (2013.01)

(58) Field of Classification Search
CPC ..... H04L 12/24; H04L 29/06; H04L 41/0846; H04L 9/3247; H04L 63/0823
See application file for complete search history.

(56) References Cited

U.S. PATENT DOCUMENTS

| | | | |
|---|---|---|---|
| 9,967,334 | B2 | 5/2018 | Ford |
| 2015/0188714 | A1* | 7/2015 | Leoutsarakos ...... H04L 63/0823 713/176 |
| 2017/0243212 | A1* | 8/2017 | Castinado ............. H04L 9/3236 |
| 2017/0346693 | A1 | 11/2017 | Dix et al. |
| 2018/0167198 | A1 | 6/2018 | Muller et al. |
| 2019/0182257 | A1* | 6/2019 | Lee .................. G06Q 10/06315 |
| 2019/0244306 | A1* | 8/2019 | Kursun ................. G06F 16/137 |
| 2019/0258971 | A1* | 8/2019 | Winarski ....... G06Q 10/063114 |

FOREIGN PATENT DOCUMENTS

CN          106796524 A  *  5/2017   .......... G06F 11/1448

OTHER PUBLICATIONS

Kinkelin et al., "Trustworthy Configuration Management for Networked Devices Using Distributed Ledgers," arXiv:1804.04798v2 [cs.CR] May 8, 2018, 5 pages.

(Continued)

*Primary Examiner* — Christopher B Robinson
(74) *Attorney, Agent, or Firm* — Patterson + Sheridan, LLP (57) ABSTRACT

Techniques and mechanisms for secure management of network device configuration and audit are provided. A configuration blockchain is received by a first network device of a plurality of network devices. Additionally, the first network device analyzes the configuration blockchain to identify a plurality of configuration records associated with a second network device of the plurality of network devices. For at least one respective configuration record of the plurality of configuration records, the first network device determines a respective configuration change reflected in the at least one respective configuration record, and implements the respective configuration change on the first network device.

20 Claims, 8 Drawing Sheets

(56) References Cited

OTHER PUBLICATIONS

Alvarenga et al., "Securing Configuration Management and Migration of Virtual Network Functions Using Blockchain," 978-1-5386-3416-5/18, IEEE, 9 pages.

Mayra Samaniego and Ralph Deters, "Virtual Resources & Blockchain for Configuration Management in IoT," Journal of Ubiquitous Systems & Pervasive Networks, vol. 9, No. 2, (2017) pp. 01-13.

Spencer Suderman, "Can Blockchain Improve Network Management?" [Accessed Online] <http://isg-one.com/index/module-article-detail/can-blockchain-improve-network-management> Jul. 26, 2018.

Huh et al., "Managing IoT devices using blockchain platform," [Accessed Online] https://ieeexplore.ieee.org/document/7890132/ [Abstract Only] Jul. 26, 2018.

* cited by examiner

SECURE MECHANISM TO MANAGE NETWORK DEVICE CONFIGURATION AND AUDIT WITH A BLOCKCHAIN

TECHNICAL FIELD

Embodiments presented in this disclosure generally relate to device configuration. More specifically, embodiments disclosed herein relate to use of a distributed ledger to manage and adjust device configuration, and improve audit capabilities.

BACKGROUND

In order to control the functionality of a network, each device is often given a specific set of configurations to regulate how it operates. In typical networks, the device configuration for any given device is stored on that individual machine. Problematically, if a device fails or needs to be replaced, this configuration information may be lost unless it is stored remotely as well. In order to provide this redundancy, some existing solutions utilize a service that periodically interrogates each device for its current configuration, and stores this information remotely. However, this solution is inadequate in that it does not indicate an ordering or timing of the changes, who or what made the changes, and the like. Further, these services may be unsecure, unavailable, or unreliable.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

According to one embodiment presented in this disclosure, a method is provided. The method includes receiving, by a first network device of a plurality of network devices, a configuration blockchain. The method also includes analyzing, by the first network device, the configuration blockchain to identify a plurality of configuration records associated with a second network device of the plurality of network devices. Additionally, for at least one respective configuration record of the plurality of configuration records, the method includes determining, by the first network device, a respective configuration change reflected in the at least one respective configuration record, and implementing, by the first network device, the respective configuration change on the first network device.

According to a second embodiment presented in this disclosure, a computer program product is provided. The computer program product includes a computer-readable storage medium having computer-readable program code embodied therewith, the computer-readable program code executable by one or more computer processors to perform an operation. The operation includes receiving, by a first network device of a plurality of network devices, a first configuration change, and implementing, by the first network device, the first configuration change. The operation additionally includes generating a first configuration record based on the first configuration change. Finally, the operation includes broadcasting, by the first network device, the first configuration record to at least a second network device of the plurality of network devices, wherein the first configuration record is included in a configuration blockchain by the second network device.

According to a third embodiment presented in this disclosure, a system is provided. The system includes one or more computer processors and a memory containing a program which when executed by the one or more computer processors performs an operation. The operation includes receiving, by a first network device of a plurality of network devices, a configuration blockchain. The operation further includes analyzing, by the first network device, the configuration blockchain to identify a plurality of configuration records associated with a second network device of the plurality of network devices. Additionally, for at least one respective configuration record of the plurality of configuration records, the operation includes determining, by the first network device, a respective configuration change reflected in the at least one respective configuration record, and implementing, by the first network device, the respective configuration change on the first network device. The operation also includes receiving, by the first network device, a first configuration change, implementing, by the first network device, the first configuration change, and broadcasting, by the first network device, a first configuration record to at least a third network device of the plurality of network devices, wherein the first configuration record is included in the configuration blockchain by the third network device.

Example Embodiments

Embodiments of the present disclosure provide mechanisms for devices to store their configuration changes in a secure and distributed blockchain. As described herein, a configuration blockchain is a blockchain that stores configuration information associated with computing devices. Additionally, in embodiments, the configuration blockchain can be reviewed and analyzed to identify the timing and ordering of all configuration changes, as well as the entity who ordered the change. Further, in some embodiments, the configuration blockchain can be dynamically replayed in order to enable a device to automatically configure itself based on prior configuration changes. Although network devices are utilized herein as examples, embodiments of the present disclosure can be used for any technical field that involves configuration of devices.

In an embodiment, a controller or configuration device transmits configuration updates to a device. In one embodiment, the devices to be configured are network devices, such as switches, routers, and the like. In one embodiment, the controller and network devices operate as part of a software defined network. In embodiments, when a network device receives a configuration change, the device implements the new configuration, records the change in a ledger, and broadcasts a record of the change to one or more other network devices. Each device in the configuration blockchain network can then maintain a ledger of all changes that have occurred on any device in the network.

Figure 1:
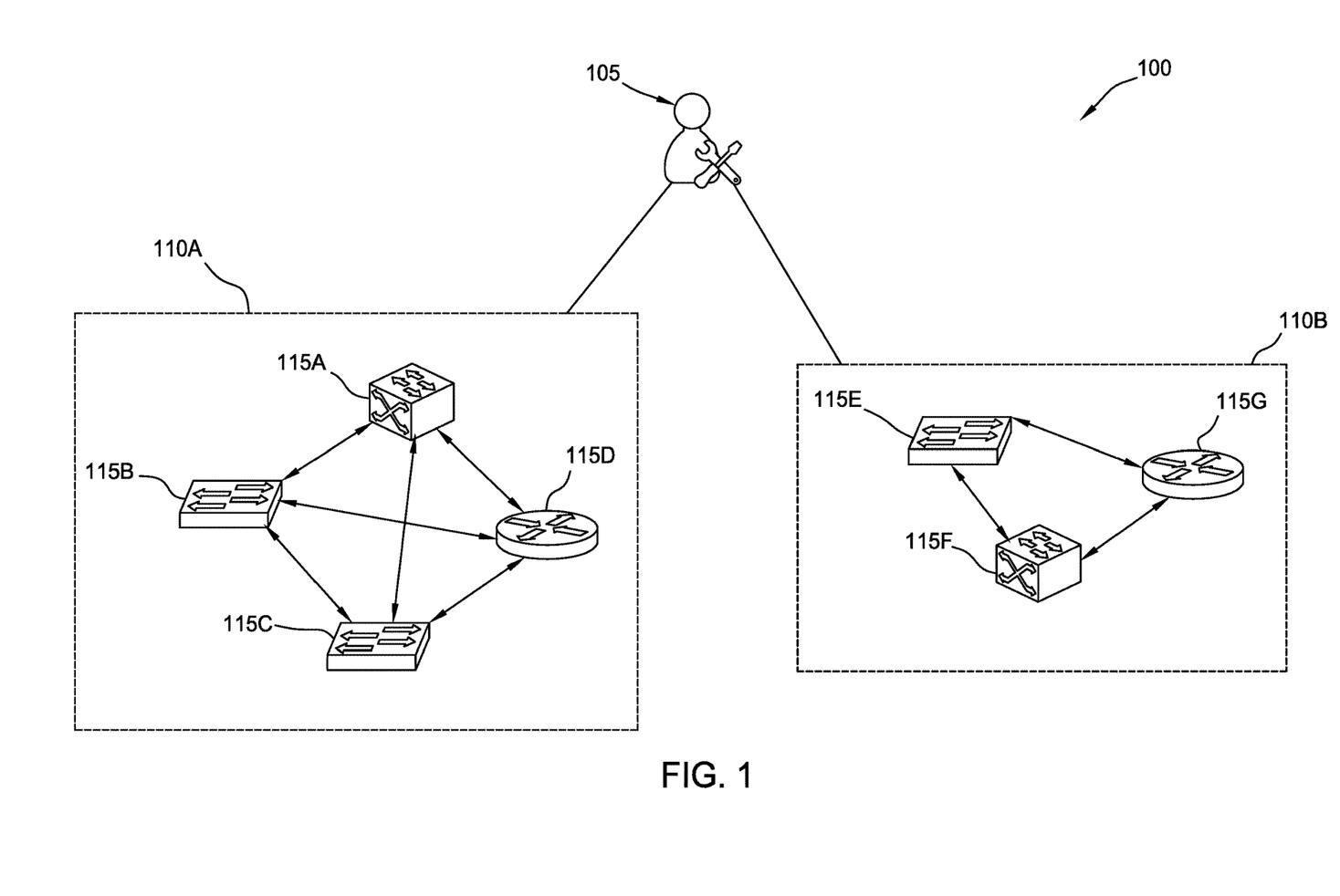
FIG. 1 illustrates a system network devices configured to utilize one or more blockchains for device configuration, according to one embodiment disclosed herein.

FIG. 1 illustrates a system 100 including Network Devices 115 configured to utilize one or more blockchains for device configuration, according to one embodiment disclosed herein. The illustrated embodiment includes two Networks 110A and 110B, each of which are controlled by a Controller 105. Although a single Controller 105 is illustrated for simplicity, in embodiments, each Network 110 may be associated with a distinct Controller 105. Further, in embodiments, there may be multiple Controllers 105 associated with a single Network 110, depending on the particular implementation. In an embodiment, each Network 110 may be communicatively coupled with one or more other networks. For example, in one embodiment, each Network 110 operates as a subnetwork of one or more broader networks, such as the Internet. In some embodiments, the Network(s) 110 may be operate as a secure or private network, with limited or restricted access to the Internet. In some embodiments, the Network(s) 110 are entirely isolated from the Internet.

As illustrated, the Network 110A includes Network Devices 115A, 115B, 115C, and 115D. In the illustrated embodiment, each Network Device 115A-D in the Network 110A is communicatively coupled with each other Network Device 115A-D. In embodiments, the communications connections between each Network Device 115A-D is defined by a user or administrator, or by the topography of the network, and the Network Devices 115A-D and any two Network Devices 115 may or may not be connected. That is, although the illustrated Network 110A includes connections between and among all Network Devices 115A-D, in embodiments, some Network Devices 115A-D may be only partially connected, in that it can directly communicate with only a subset of the devices in the Network 110A.

Further, although the illustrated embodiment includes four Network Devices 115A-D in the Network 110A, there may be any number and arrangement of Network Devices 115 in various embodiments. In the illustrated embodiment, the Network 110A and Network 110B form logical groupings of Network Devices 115. In an embodiment, these groupings are defined by a user or administrator, such as via the Controller 105. In one embodiment, each Network 110A and 110B correspond to a particular geographic location, site, enterprise, and the like. In some embodiments, each Network Device 115 in a logical grouping shares a single configuration blockchain. For example, in the illustrated embodiment, the Network Devices 115A-D utilize a first configuration blockchain, while the Network Devices 115E-G utilize a second, separate configuration blockchain.

In the illustrated embodiment, the Controller 105 transmits configuration changes to each of the Network Devices 115. Upon receiving a configuration, the Network Device 115 updates its configuration, records the change, and broadcasts a record of the change to one or more other devices in its Network 110A or 110B. For example, suppose the Controller 105 transmits an updated configuration to Network Device 115F. In an embodiment, once Network Device 115F has implemented the configuration change, it broadcasts a record of the change (sometimes referred to as a transaction) to the Network Devices 115E and 115G to be included in the configuration blockchain associated with the logical grouping of devices (e.g., the Network 110B). Upon receiving the indication, in an embodiment, each of the Network Devices 115E and 115G record it in their own ledger. In some embodiments, one or more Controllers 105 also receive the change record and maintain a copy of the configuration blockchain.

In embodiments, the configuration record can include an indication as to the device which was configured, the entity that ordered the configuration change (which may include an indication of the Controller 105, the user or administrator who provided it, and the like), the timing of the change, the contents of the change, and the like. In an embodiment, each of the Network Devices 115E-G includes a configuration blockchain client that maintains its ledger, as well as attempts to satisfy predefined criteria (such as finding a solution to a predefined algorithm). When the algorithm is completed successfully by one of the Network Devices 115E-G, the successful Network Device 115 closes the current block it has stored in its ledger, finalizing all transactions or records contained therein. The Network Device 115 further broadcasts this finalized block to the other devices in the Network 110B, which validate the block (e.g., by confirming that the algorithm was completed). Upon validating the block, each Network Device 115E-G incorporates it into their copy of the configuration blockchain, and begins processing a new block.

In one embodiment, the algorithm is defined by a user or administrator. In one embodiment, solving the algorithm comprises using a hash algorithm to generate a hash value below a predefined value. In an embodiment, each blockchain client computes a hash of their current block, as well as a nonce value, to determine whether the hash value is below the predefined value. If not, the blockchain client changes the nonce and re-computes the hash. In an embodiment, the computational difficulty of solving the algorithm can be adjusted by a user or administrator based on changing the predefined value. For example, to reduce the complexity of the algorithm (and therefore reduce the time and compute resources needed to close a block), an administrator may increase the predefined value. Similarly, to increase the complexity, the user can lower the predefined value. Of course, in embodiments, any algorithm may be used. Further, in some embodiments, other predefined criteria may be specified to cause the close of a configuration block. For example, in one embodiment, the block may be closed once a predefined time has passed, or some other predefined event occurs.

In an embodiment, the algorithm or predefined criteria are selected to minimize the computational resources needed to complete a configuration block. For example, in one embodiment, an algorithm or value is defined by a user or administrator to ensure that it can be solved or completed using defined compute resources (e.g., a number of clock cycles, an amount of memory, and the like). Similarly, in some embodiments, the blockchain client on each Network Device 115 has limited or reduced access to the compute resources available on the device for other operations. In this way, a network administrator can ensure that solving the algorithm does not interfere with the normal operations of the device.

In embodiments, the configuration blockchain for any particular Network 110 can be retrieved and analyzed at any time. Because of its distributed and secure nature, the configuration blockchain aids the audit or investigation process if a problem is identified, a Network Device 115 stops functioning, and the like. For example, via the Controller 105 or another device, a user or administrator can retrieve a copy of the blockchain for any given logical grouping of devices. This blockchain can then be parsed to determine which configuration changes were entered, by whom, and at what time.

Additionally, in embodiments, the configuration blockchain eases the process of resource management and allocation (RMA). For example, in an embodiment, if a particular Network Device 115 is being replaced, the newly inserted device can receive the configuration blockchain, identify records associated with the device it is replacing, and automatically implement each of these configuration changes in their original order. This allows for a seamless transition. In one embodiment, when a new device is activated, it announces its presence to the logical group. Upon determining that the device is to replace an existing or prior device, in one embodiment, one or more neighboring devices can transmit the blockchain to the new device. For example, in one embodiment, a user can record a record in the configuration blockchain indicating that the new device (identified by a unique identifier) is to replace another specified device. In such an embodiment, when the existing devices receive the indication that the new device is active, they can respond accordingly.

In another embodiment, the newly activated device may receive an indication (such as a configuration policy) instructing it to retrieve the blockchain from one or more neighboring devices, and implement one or more configuration changes that were applied to one or more other specified devices. In such an embodiment, the new device can request the blockchain from one or more other device in the logical group, parse the blockchain to identify the records it is to implement, and complete the configuration.

Figure 2:
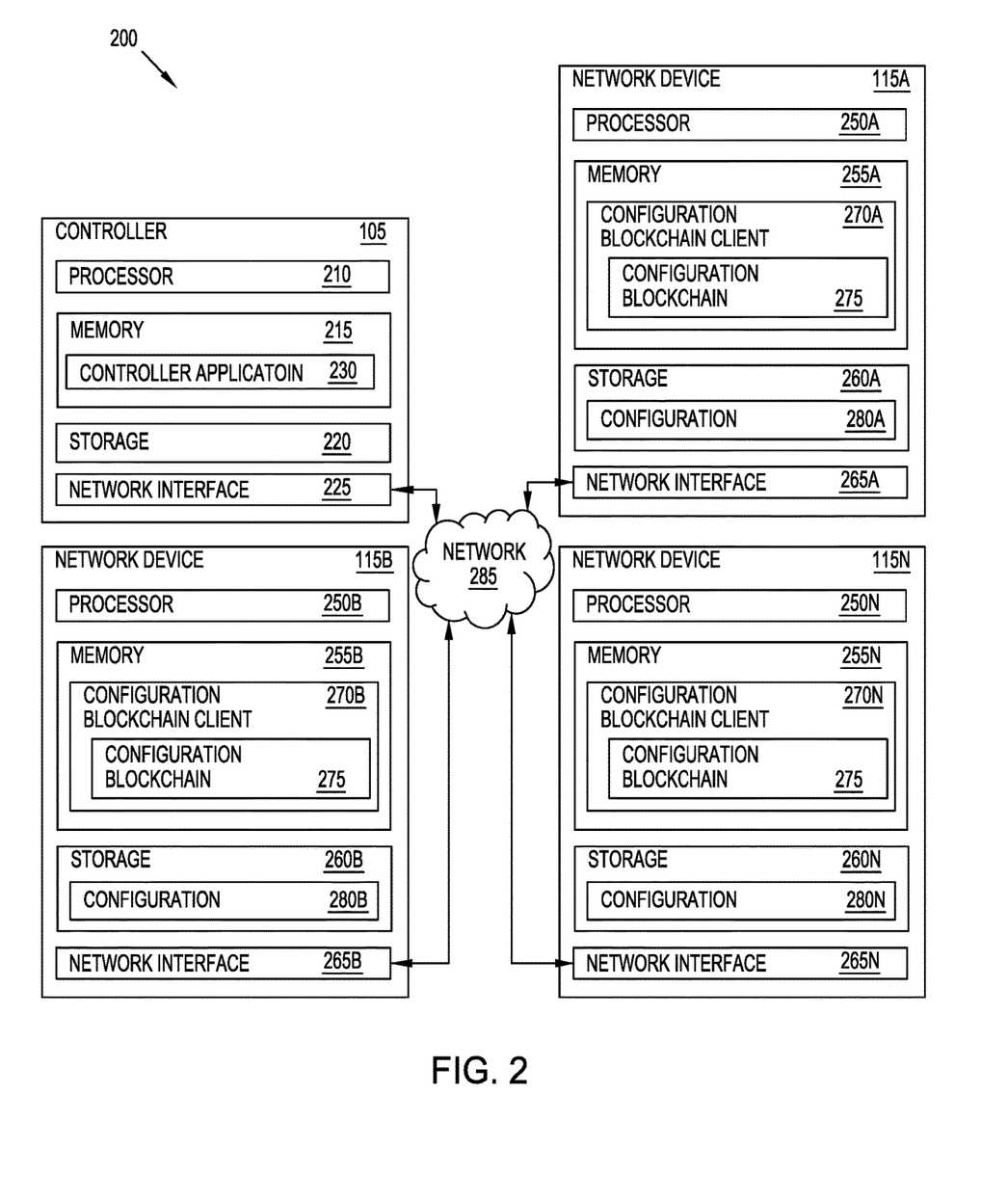
FIG. 2 is a block diagram of a system of network devices configured to utilize one or more blockchains for device configuration, according to one embodiment disclosed herein.

FIG. 2 is a block diagram of a system 200 of Network Devices 115A-N configured to utilize one or more blockchains for device configuration, according to one embodiment disclosed herein. In the illustrated embodiment, the system 200 includes a Controller 105 and three Network Devices 115A-N. Although three Network Devices 115A-N are illustrated, in embodiments, any number of devices may be included in the network. Similarly, although a single Controller 105 is depicted, any number of Controllers 105 may be utilized in various embodiments.

As illustrated, the Controller 105 includes a Processor 210, a Memory 215, Storage 220, and a Network Interface 225. In the illustrated embodiment, Processor 210 retrieves and executes programming instructions stored in Memory 215 as well as stores and retrieves application data residing in Storage 220. Processor 210 is representative of a single CPU, multiple CPUs, a single CPU having multiple processing cores, and the like. Memory 215 is generally included to be representative of a random access memory. Storage 220 may be a disk drive or flash-based storage device, and may include fixed and/or removable storage devices, such as fixed disk drives, removable memory cards, or optical storage, network attached storage (NAS), or storage area-network (SAN). Through the Network Interface 225, the Controller 105 may be communicatively coupled with other devices, such as the Network Devices 115A-N.

In the illustrated embodiment, the Memory 215 of the Controller 105 includes a Controller Application 230. The Controller Application 230 is used to transmit configurations and other controls to the Network Devices 115A-N. In one embodiment, the Controller 105 operates in a software defined network (SDN) and controls the configurations regarding forwarding rules, security, and the like for each Network Device 115A-N. In some embodiments, a user or administrator accesses the Controller 105 to implement these configuration changes. In some embodiments, the Controller 105 also maintains a copy of the configuration blockchain used by the Network Devices 115A-N it controls.

As illustrated, each Network Device 115A-N includes a respective Processor 250A-N, Memory 255A-N, Storage 260A-N, and Network Interface 265A-N. In the illustrated embodiment, each Processor 250A-N retrieves and executes programming instructions stored in the respective Memory 255A-N as well as stores and retrieves application data residing in the respective Storage 260A-N. Each Processor 250A-N is representative of a single CPU, multiple CPUs, a single CPU having multiple processing cores, and the like. Similarly, each Memory 255A-N is generally included to be representative of a random access memory. Additionally, each Storage 260A-N may be a disk drive or flash-based storage device, and may include fixed and/or removable storage devices, such as fixed disk drives, removable memory cards, or optical storage, network attached storage (NAS), or storage area-network (SAN). Through their respective Network Interfaces 265A-N, each Network Device 115A-N is communicatively coupled with other devices, including one or more other Network Devices 115A-N, one or more Controllers 105, and the like.

In the illustrated embodiment, the Memory 255A-N of each Network Device 115A-N includes a respective Configuration Blockchain Client 270A-N. In an embodiment, each Configuration Blockchain Client 270A-N maintains a copy of the Configuration Blockchain used by the logical grouping of Network Devices 115A-N. For example, in an embodiment, when a Network Device 115A-N receives and implements a new configuration from the Controller 105, the Configuration Blockchain Client 270A-N of the Network Device 115A-N generates a record of the change, updates its ledger to reflect the change, and broadcasts the change to the other Network Devices 115A-N.

Further, in an embodiment, each respective Configuration Blockchain Client 270A-N attempts to solve the defined algorithm, or otherwise verify a predefined criterion, that triggers the end of the current block. Upon determining that the criteria is satisfied, the respective Configuration Blockchain Client 270A-N transmits an indication to the other Network Devices 270A-N, who verify the solution and accept the new block. In this way, each time a configuration change is made to any Network Device 115A-N, it is recorded by each Network Device 115A-N.

Figure 3:
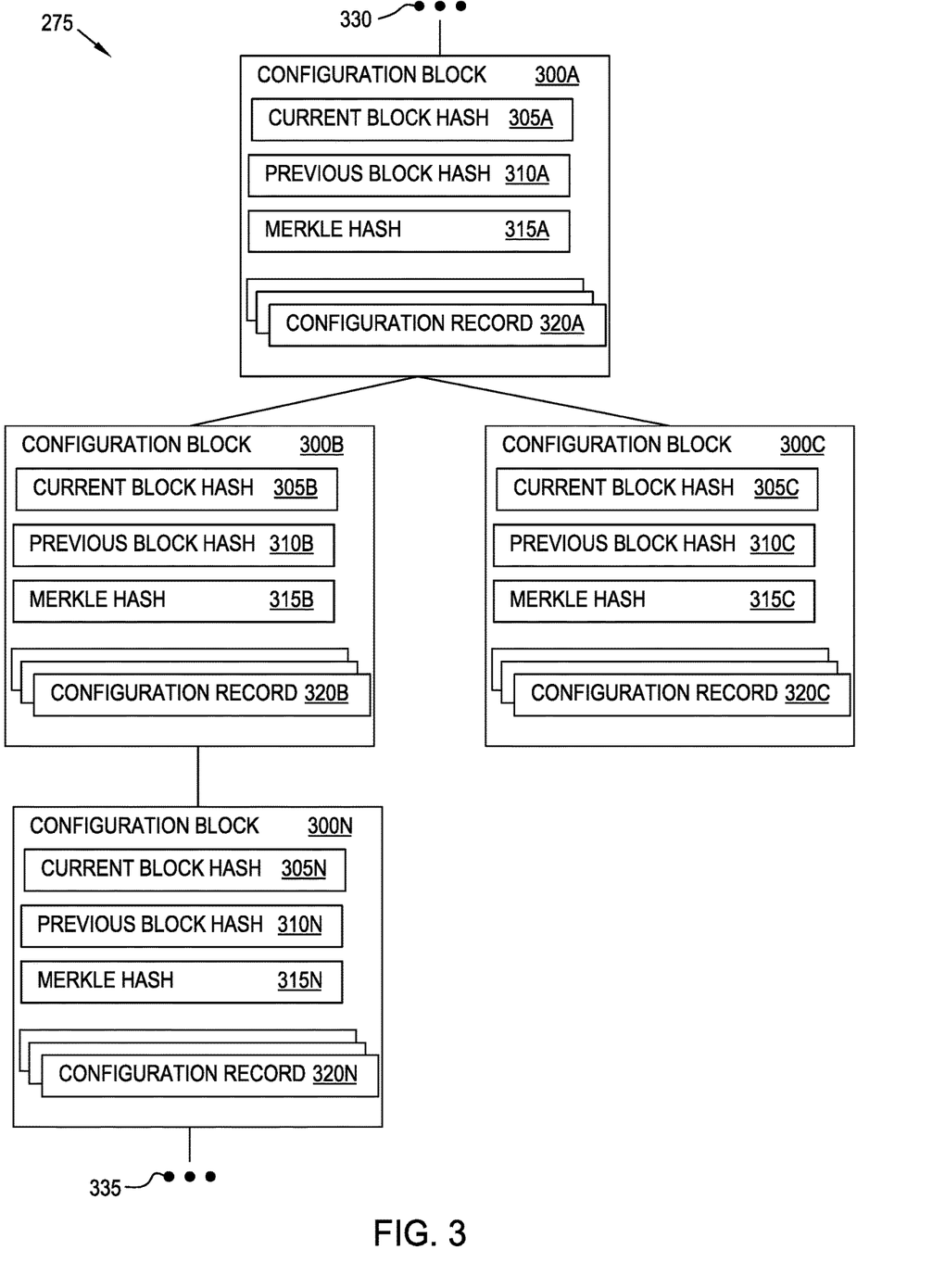
FIG. 3 illustrates several blocks in a configuration blockchain, according to one embodiment disclosed herein.

FIG. 3 illustrates several Blocks 300A-N in a Configuration Blockchain 275, according to one embodiment disclosed herein. Although four blocks are illustrated, as indicated by the ellipses 330 and 335, the Configuration Blockchain 275 may include any number of blocks preceding and following the illustrated Configuration Blocks 300A-N. As illustrated, in an embodiment, each Configuration Block 300A-N in the Configuration Blockchain 275 includes a respective Current Block Hash 305A-N, a respective Previous Block Hash 310A-N, and a respective Merkle Hash 315A-N. Further, as illustrated, each respective Configuration Block 300A-N includes a respective set of Configuration Records 320A-N.

In an embodiment, the Current Block Hash 305A includes a hash value representing the Configuration Block 300A. In embodiments, the Current Block Hash 305A may be based in part on the Previous Block Hash 310A and the Merkle Hash 315A. In some embodiments, the Current Block Hash 300A is also based in part on a nonce value, as discussed above, or other data. Further, in the illustrated embodiment, the Previous Block Hash 310A refers to the hash of the previous block in the chain. For example, the Previous Block Hash 310B in Configuration Block 300B has the same value as the Current Block Hash 305A in Configuration Block 300A. Similarly, the Previous Block Hash 310N in Configuration Block 300N has the same value as the Current Block Hash 305B in Configuration Block 300B.

In the illustrated embodiment, the Merkle Hash 315A-N of a Configuration Block 300A-N is based on each of the Configuration Records 320A-N included in the respective Configuration Block 300A-N. For example, in one embodiment, each of the Configuration Records 320A-N included in the ledger of the Configuration Block 300A-N is hashed, and the resulting values are iteratively combined and hashed until a final value (e.g., a Merkle Hash 315A-N) representing all of the Configuration Records 320A-N in the Configuration Block 300A-N is created. In this way, none of the individual Configuration Records 320A-N can be modified or removed, as this would change the Merkle Hash 315A. Further, in embodiments, a change in the Merkle Hash 315A would cause the Current Block Hash 305A to change as well. This, in turn, would cause the hash of each subsequent block (e.g., Current Block Hash 305B) to change. In this way, the Configuration Blockchain 275 is secure and consistent.

In the illustrated embodiment, two blocks (Configuration Blocks 300B and 300C) were created to follow Configuration Block 300A. For example, this may occur if two Network Devices 115 solve the algorithm and broadcast valid solutions simultaneously (or within the communications delay of the network). In embodiments, this is referred to as a fork in the Configuration Blockchain 275. In some embodiments, the fork is remedied manually by a user or administrator (e.g., by indicating which Configuration Block 300B or 300C to use). In other embodiments, the "correct" block is determined based on the subsequent Configuration block 300N.

For example, if a fork occurs, some of the Network Devices 115 may be working based on the a version of the Configuration Blockchain 275 that includes Configuration Block 300B, while other Network Devices 115 are operating based on the a version of the Configuration Blockchain 275 that includes Configuration Block 300C. Subsequently, when one of the Network Devices 115 completes the next block and broadcasts its solution, in an embodiment, all Network Devices 115 accept this new Configuration Block 300N, as well as any prior blocks, because it is the longest version of the Blockchain 275 that is available. In this way, the Network Devices 115 may correct forks automatically.

Figure 4:
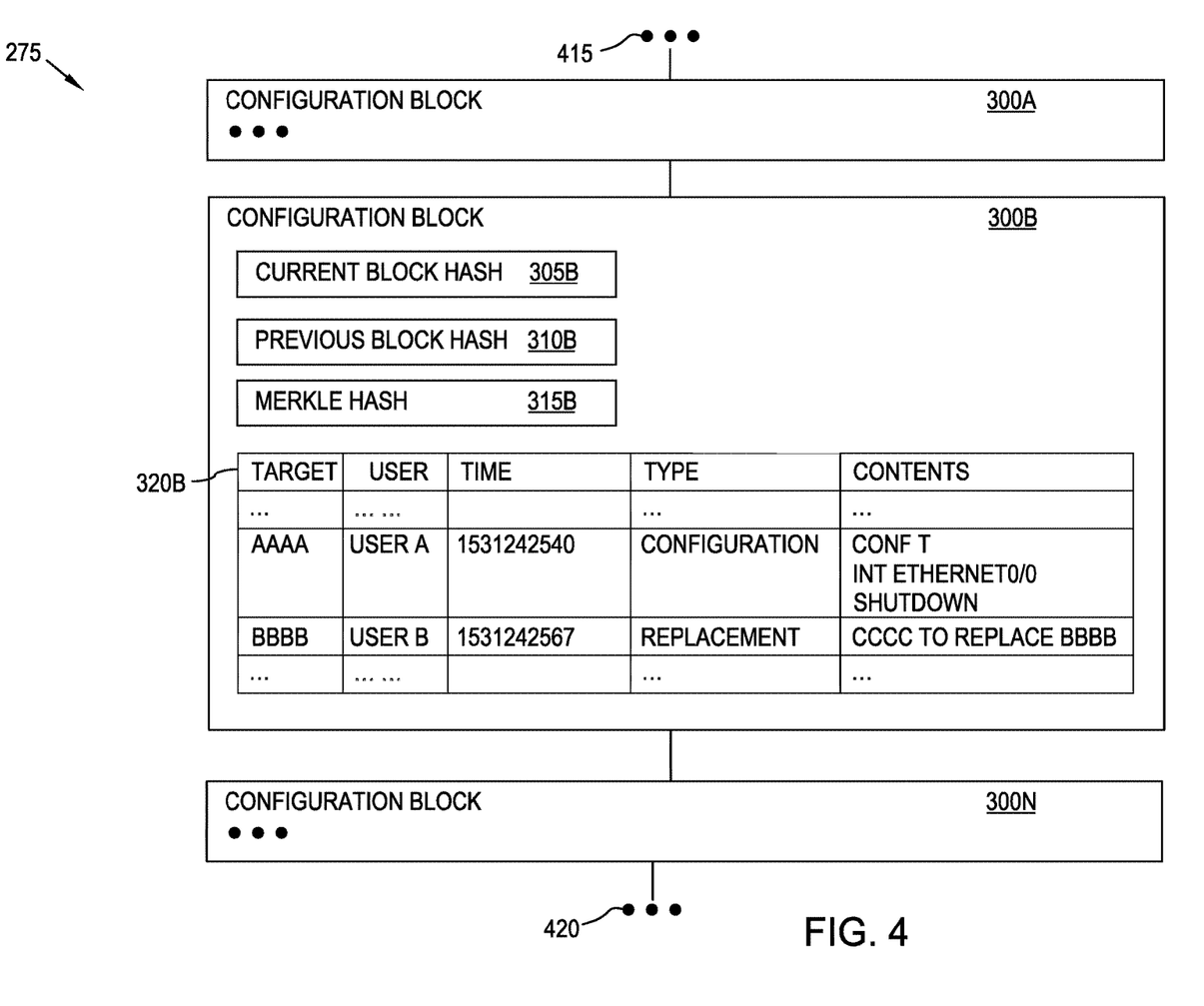
FIG. 4 illustrates a configuration block in a configuration blockchain, according to one embodiment disclosed herein.

FIG. 4 illustrates a Configuration Block 300B in a Configuration Blockchain 275, according to one embodiment disclosed herein. Although three Configuration Blocks 300A-N are depicted, as illustrated by the ellipses 415 and 420, the Configuration Blockchain 275 may include any number of blocks. Further, although only the Configuration Block 300B is illustrated in detail, as indicated by the ellipses in the Configuration Blocks 300A and 300N, similar information resides in each of the blocks. In the illustrated embodiment, as discussed above, the Configuration Block 300B includes a Current Block Hash 305B, a Previous Block Hash 310B, and a Merkle Hash 315B. Further, as illustrated, each of the Configuration Records 320B are stored in a ledger.

In the illustrated embodiment, the ledger includes an indication as to the target device (e.g., the Network Device 115 that was the target of the configuration change), the user (e.g., the user who initiated the change), the time at which the change was received and/or implemented, the type of the record, and the contents of the record. In an embodiment, each Configuration Record 320B specifies a particular type. In one embodiment, one such type is "configuration," indicating that the record corresponds to a configuration change or update. Similarly, in one embodiment, a "replacement" type indicates that one or more identified Network Devices 115 are being replaced with one or more other Network Devices 115. Additional types of Configuration Record 320B may also be utilized, in various embodiments.

In the illustrated embodiment, the contents of the Configuration Record 320B indicate what changes or updates were included in the underlying configuration change. In some embodiment, each Configuration Record 320 includes one or more digital signatures to validate its authenticity. For example, in one embodiment, the Configuration Record 320B are signed using a certificate (such as a secure unique device identification or SUDI) certificate of the Network Device 115 that implemented the change, the Controller 105, or both.

In one embodiment, the "target" for a "replacement" record refers to the device that is being replaced. In such an embodiment, the target device may take various actions, such as transmitting the blockchain to the replacement device, shutting itself down, and the like. In some embodiments, the "target" of a replacement record indicates the device that is being activated. In such an embodiment, upon being activated, one or more network devices can identify, based on the blockchain record, that the new device is to replace the old device, and transmit the blockchain to the new device. Similarly, in an embodiment, the new device may itself request the blockchain, analyze the records to determine that it is to replace the specified device(s), and retrieve configuration records for each of those identified devices.

Figure 5:
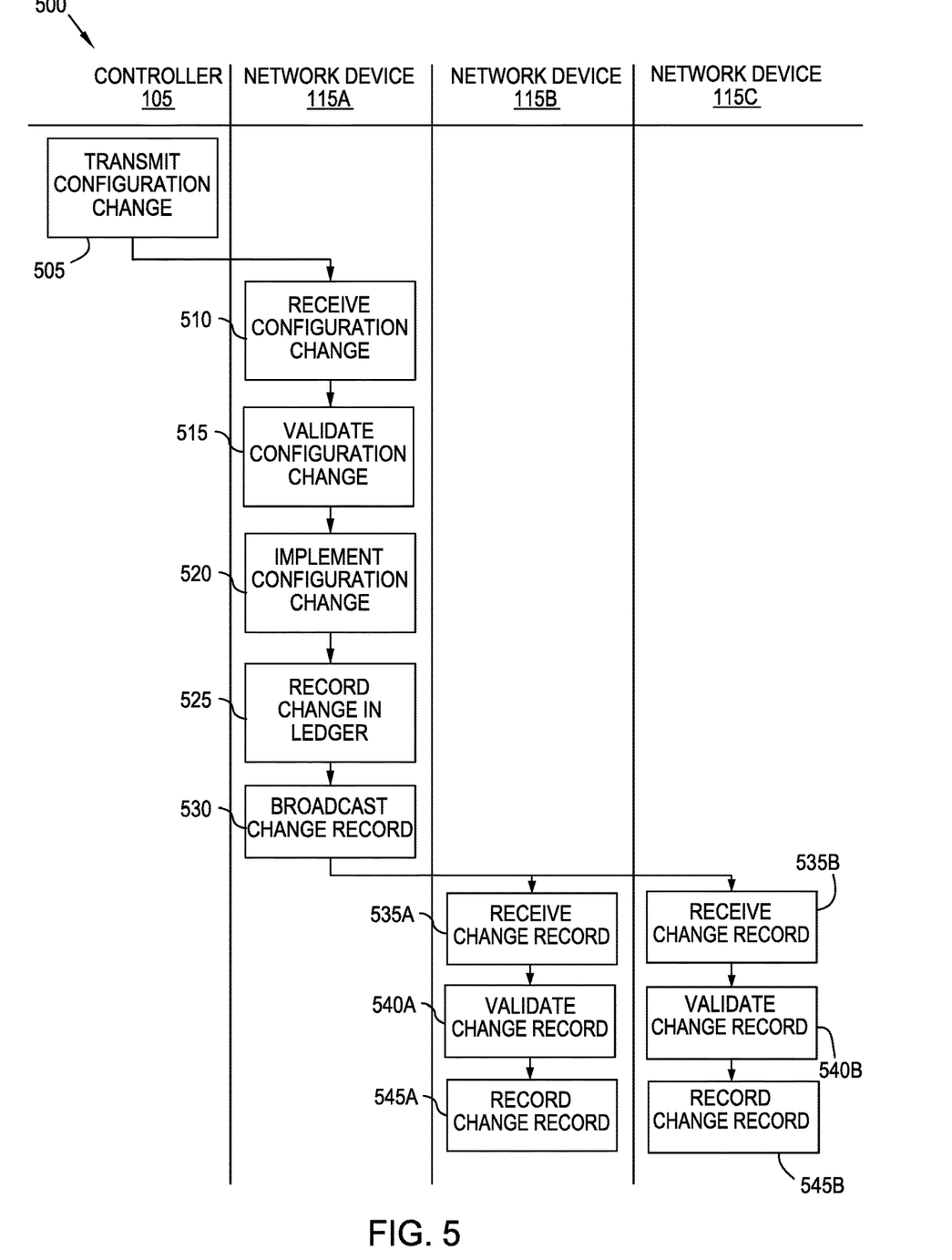
FIG. 5 illustrates a workflow for maintaining a configuration blockchain, according to one embodiment disclosed herein.

FIG. 5 illustrates a workflow 500 for maintaining a configuration blockchain, according to one embodiment disclosed herein. The illustrated workflow 500 includes operations performed by a Controller 105 and three Network Devices 115A-C. At block 505, the Controller 105 transmits a configuration change to the Network Device 115A. Of course, in embodiments, the Controller 105 can transmit configuration changes to any of the Network Devices 115 A-C. In embodiments, this change may include adding a new rule, removing or modifying an existing rule, and the like. At block 510, the Network Device 115A receives the configuration change. At block 515, the Network Device 115A validates the change. In one embodiment, validating the configuration change comprises confirming that it was transmitted or signed by a trusted Controller 105. Additionally, in some embodiments, validating the configuration change includes confirming that an authorized user or administrator initiated the change.

Further, in some embodiments, validating the change includes determining whether the Network Device 115A can implement the change (e.g., whether it is a valid configuration for the Network Device 115A). In an embodiment, if the change cannot be validated, the Network Device 115A discards it and the workflow 500 ends. In some embodiments, the Network Device 115A may notify the Controller 105 and/or other devices of the failed configuration change. In one embodiment, the Network Device 115A may generate a record of this failure, and transmit it to each other Network Device 115B and 115C to be included in the configuration blockchain.

In the illustrated embodiment, however, the Network Device 115A successfully validates the configuration change. Upon validating the change, the Network Device 115A implements the change(s) at block 520. That is, at block 520, the Network Device 115A updates any configurations it has stored based on the change, and performs any other actions identified in the configuration change (such as rebooting).

Once the configuration has been implemented, at block 525, the Network Device 115A creates a configuration record based on the change, and records it in its own ledger. Similarly, at block 530, the Network Device 115A broadcasts the configuration record to one or more other devices that share the Configuration Blockchain 275. In the illustrated embodiment, this includes Network Devices 115B and 115C. In some embodiments, the Network Device 115A may update its ledger and/or broadcast the configuration record as soon as the change is validated, rather than waiting until after it has been fully implemented.

In one embodiment, a Configuration Blockchain 275 is distributed across the Network Devices 115 at a particular site, enterprise, geographic location, and the like. In this way, the Network Devices 115 can track their configurations (and automatically recover prior configurations) even in the absence of a connection to a remote server (e.g., via the Internet). For example, if the Network Devices 115 operate in a private network or are otherwise disconnected from a larger network, such as the Internet, they may be unable to store their configuration changes using existing solutions. Similarly, if the remote server is unreachable, a device needing to be replaced or reconfigured based on prior configurations must be manually reconfigured in existing solutions. Embodiments of the present disclosure provide a consistent, secure, and reliable Configuration Blockchain 275 that resides on the local Network Devices 115 themselves.

In some embodiments, the Network Device 115A may sign or otherwise validate the configuration record prior to broadcasting it to the other Network Devices 115B and 115C. For example, in one embodiment, the Network Device 115A utilizes a SUDI certificate securely stored at manufacturing time. In one embodiment, the Configuration Blockchain Client 270 executes via a device configuration management system, such as a Plug and Play (PNP) agent, developed by Cisco Systems of San Jose, Calif. By signing the configuration record with a secure and unique identifier, each other Network Device 115B and 115C can confirm the accuracy and validity of the record.

In the illustrated embodiment, at blocks 535A and 535B, the Network Devices 115B and 115C, respectively, receive the configuration record from the Network Device 115A. At blocks 540A and 540B, the Network Devices 115B and 115C validate the record. For example, in one embodiment, validating the record comprises reviewing the signature or identifier associated with the record to confirm that it originated from a Network Device 115 within the logical group associated with the Blockchain 275. Further, in an embodiment, validating the record includes confirming that the device listed as the "target" in the record is the same as the device that created or transmitted the record. Once the record has been validated, in the illustrated workflow 500, each of the Network Devices 115B and 115C record the configuration record in their respective ledgers.

In some embodiments, once a Network Device 115 receives a record from another device, the Network Device 115 may first determine whether they have already recorded it in their respective ledger. If not, the Network Device 115 records the change. Further, in some embodiments, each Network Device 115 re-broadcasts the configuration record upon receipt. In this way, the record can propagate throughout a network, to ensure that each connected device receives a copy of the record, even if the device is not directly connected to the originally updated device. In one embodiment, each Network Device 115 broadcasts the record only once, regardless of how many times it receives the record from other devices.

Figure 6:
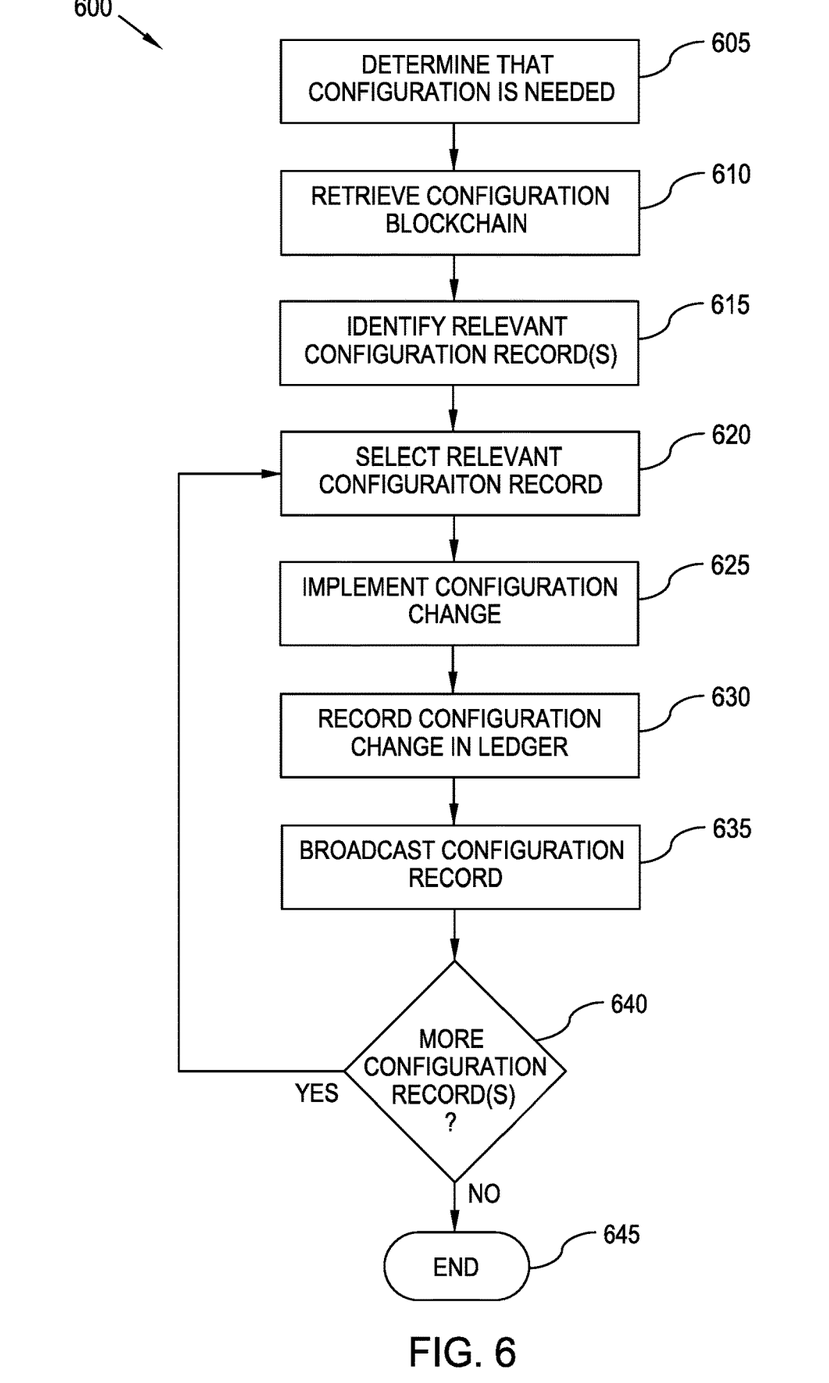
FIG. 6 is a flow diagram illustrating a method of utilizing a configuration blockchain, according to one embodiment disclosed herein.

FIG. 6 is a flow diagram illustrating a method 600 of utilizing a configuration blockchain, according to one embodiment disclosed herein. The illustrated method 600 can be used to "replay" old configurations, in order to recreate them in accordance with their original timing and sequence. In the illustrated embodiment, the method 600 begins at block 605, where a Network Device 115 determines that configuration is required. In one embodiment, the Network Device 115 determines that its configuration is outdated. In another embodiment, upon initial activation, the Network Device 115 determines that it must be configured. In yet another embodiment, the Network Device 115 can receive some indication that configuration is required.

At block 610, the Network Device 115 retrieves the configuration blockchain associated with the logical grouping to which the Network Device 115 belongs. For example, if a new router is enabled in an enterprise or location, the router may announce its presence and request a copy of the blockchain from any neighboring devices. In another embodiment, when the new device announces its activation, one or more other devices in the grouping transmit the blockchain to the newly activated device. In one embodiment, prior to transmitting the configuration blockchain to the new device, the existing device(s) parse their own blockchain to determine whether the newly activated device is authorized. For example, the device(s) may analyze the configuration blockchain to identify replacement records that list the new device as an authorized device to be added to the network.

Once the Network Device 115 receives the configuration blockchain, the method 600 continues to block 615, where the Network Device 115 identifies relevant configuration records in the configuration blockchain. In embodiments, identifying relevant records can be based on any defined criteria, depending on the particular implementation.

In one embodiment, identifying relevant records comprises identifying records that were authored or created by one or more specified Network Device 115, or that refer to a configuration change implemented by one or more particular devices. For example, in one embodiment, a Network Device 115A may parse the configuration blockchain to identify records corresponding to configuration updates that were implemented by Network Device 115A (e.g., itself). This may be useful because, for example, the Network Device 115A crashed, failed, or otherwise had its configurations corrupted. Once the Network Device 115A is reset, it can automatically identify its previous configurations based on the blockchain. In some embodiments, particular records can be flagged by a user or administrator, and the Network Devices 115 ignore these flagged records. For example, if a recent configuration change caused the failure, the Network Device 115A can be instructed to ignore this particular change.

In one embodiment, the Network Device 115A may determine that it is replacing another device in the network, and that it should therefore implement the configurations of that device. For example, in one embodiment, the Network Device 115A may receive a notification or indication as to the device it is replacing. In another embodiment, this notification may be stored as a record in the blockchain. In such an embodiment, the Network Device 115A may parse the blockchain to identify any records that list itself as a target, and implement these records. Further, if one or more of these records indicate that the Network Device 115A is to configure itself based on the configurations of another specified device, the Network Device 115A can retrieve the records associated with the identified device(s) that the Network Device 115A is to replicate.

In some embodiments, rather than replacing an existing device, the Network Device 115 may be intended to supplement one or more defined devices, such as by replicating the configurations of the identified device(s). In such an embodiment, the Network Device 115 may analyze each record in the configuration blockchain to identify the relevant records (such as by determining whether the specified target includes one of the identified device(s)), and implement these configuration changes in temporal order. This enables the device to automatically configure itself to exactly replicate the configuration of any other device(s).

In another embodiment, the configuration blockchain may include records with broad applicability, or that identify a set of target devices. In such an embodiment, the Network Device 115A can additionally identify such records that should be applied, even if the record does not specify any particular device. For example, a record may indicate that it applies to all switches. Regardless of the particular implementation, in block 615, the Network Device 115 identifies relevant records that it should implement. The method 600 then proceeds to block 620.

At block 620, the Network Device 115 selects one of the identified relevant configuration records. In one embodiment, the Network Device 115 selects the records in chronological order, beginning with the oldest record. In some embodiments, the Network Device 115 validates the selected configuration record, prior to implementing it. For example, in one embodiment, the Network Device 115 determines whether the configuration change was authorized. In some embodiments, however, the Network Device 115 may assume that all configuration changes reflected in the configuration blockchain were already validated, and thus forgo this additional validation step.

In some embodiments, prior to implementing the change reflected in the selected record, the Network Device 115 determines whether the change was successfully implemented originally. For example, as discussed above, in some embodiments, configuration records can include failed configuration changes. If the change was not successfully implemented, the Network Device 115 may discard the record. Additionally, in one embodiment, the Network Device 115 validates the change by confirming that it is able to implement the configuration listed in the record. In one embodiment, if this validation step fails, the Network Device 115 discards the record and selects the next one. In another embodiment, the Network Device 115 pauses the method 600, and alerts one or more other devices (e.g., a Controller 105) or users of this failure. This may allow the user or administrator to intervene and determine how to proceed. Subsequently, once the problem is corrected (such as by manually adding one or more configurations), the Network Device 115 may resume execution of the method 600, to complete its auto-configuration.

In the illustrated embodiment, at block 625, the Network Device 115 implements the configuration change reflected in the record. That is, in the illustrated embodiment, the configuration is validated (if the particular implementation requires validation) and successfully implemented on the Network Device 115. As discussed above, in embodiments, if the configuration fails for some reason (either failing validation, or failing implementation), the Network Device 115 may either discard the record and continue, or pause the method 600 and await further instruction.

The method 600 then proceeds to block 630, where the Network Device 115 records the configuration change in its own ledger. That is, at block 630, the Network Device 115 generates and stores a record indicating that it has implemented the configuration change. In one embodiment, this record includes the same content as the selected record. In one embodiment, the newly generated record includes a pointer to the selected record in the Configuration Blockchain 275, so that users can subsequently determine when the configuration was initially created, who initiated it, what device(s) was targeted, and the like.

The method 600 then proceeds to block 635, where the Network Device 115 broadcasts the record to the other devices. Upon receiving the record, each other device can update its own ledger to reflect the change. In this way, should the Network Device 115 fail or stutter during the method 600, a user or administrator (or the Network Device 115 itself) can parse the configuration blockchain to determine when it failed, and which step or configuration change was implemented or being implemented at the time.

The method 600 continues to block 640, where the Network Device 115 determines whether there are additional relevant configuration records to be processed. If so, the method 600 returns to block 620 to select the next configuration record. In an embodiment, the Network Device 115 selects the oldest identified record that has not already been implemented. If there are no remaining records, the method 600 terminates at block 645.

In the illustrated embodiment, the Network Device 115 iteratively identifies changes and implements them in order. In some embodiments, the Network Device 115 parses each identified relevant record to extract the corresponding configuration change, and assembles a list of configuration changes (e.g., a sequence of commands or policies) to be implemented. The Network Device 115 can then proceed in order through the list or sequence. In one embodiment, prior to implementing each change on the list, the Network Device 115 can parse the changes to determine whether any of the configuration changes were subsequently reversed or undone by a later configuration change. If so, in one embodiment, the Network Device 115 ignores the earlier configuration change. In some embodiments, the Network Device 115 similarly ignores some or all of the subsequent reversal (e.g., because you cannot reverse or remove a configuration change that was never implemented).

In an embodiment, when retrieving and implementing historical configuration changes, the Network Device 115 proceeds chronologically through the relevant records. In this way, the configuration of the Network Device 115 is dynamically re-configured based on prior configurations. In some embodiments, a user or administrator may instruct the Network Device 115 to only implement a subset of the changes. For example, in one embodiment, the Network Device 115 only implements changes that are more recent than a defined time. Similarly, in one embodiment, the Network Device 115 only implements changes older than a defined time.

In embodiments, these configuration records implemented by the Network Device 115 may have been associated with the Network Device 115 itself, or with one or more other devices. Advantageously, the method 600 enables rapid replacement of failed network devices, without requiring manual configuration. Further, because the Network Device 115 can replay the entire sequence of configurations (in their original sequence), the Network Device 115 can exactly replicate the prior configuration. Additionally, because the configuration changes are recorded and broadcast upon receipt, even the most recent changes are available in the blockchain.

Figure 7:
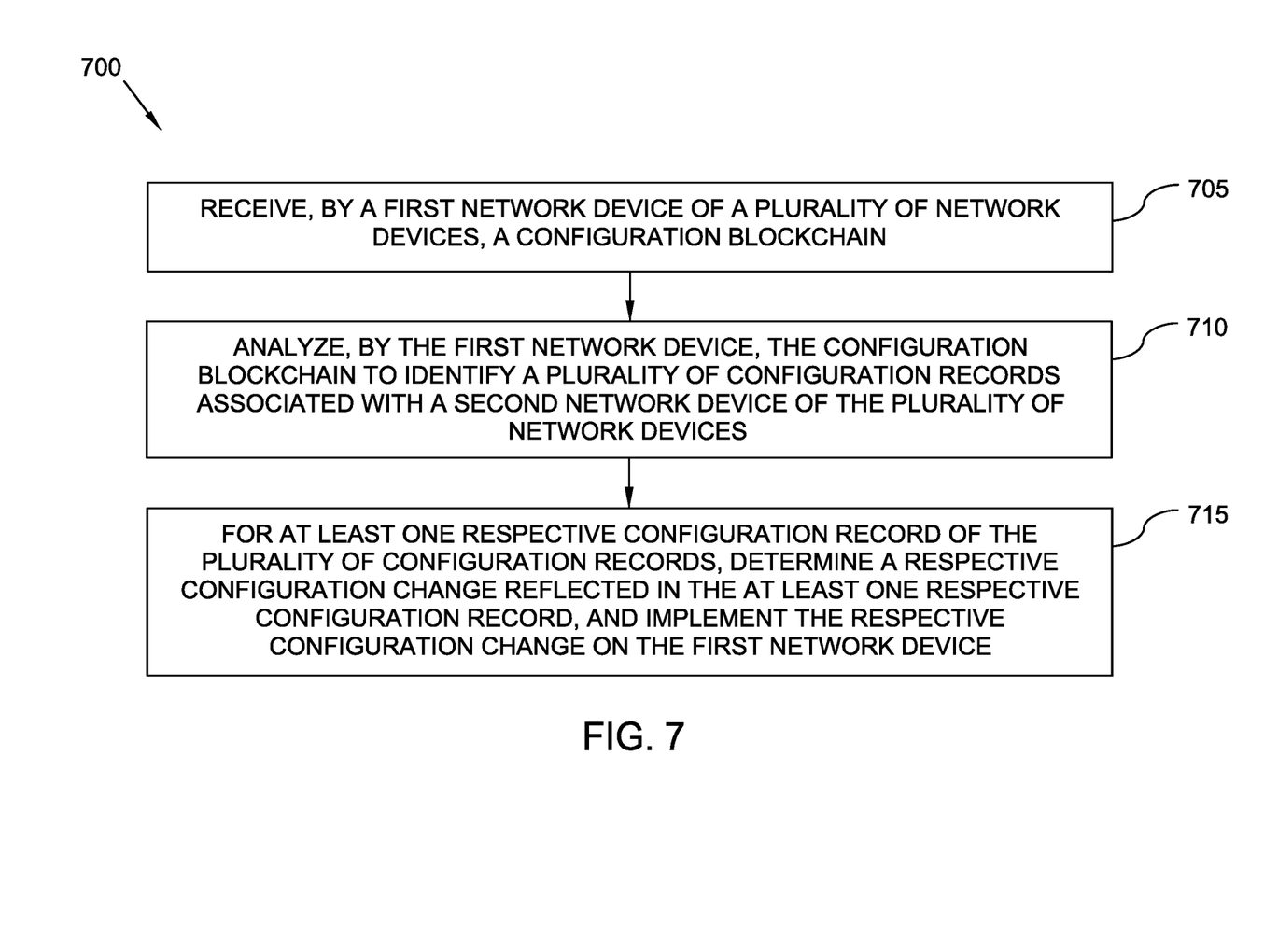
FIG. 7 is a flow diagram illustrating a method of utilizing a configuration blockchain, according to one embodiment disclosed herein.

FIG. 7 is a flow diagram illustrating a method 700 of utilizing a configuration blockchain, according to one embodiment disclosed herein. In the illustrated embodiment, the method 700 begins at block 705, where a Configuration Blockchain Client 270 of a first Network Device 115 of a plurality of network devices receives a configuration blockchain. At block 710, the Blockchain Client 270 of the first Network Device 115 analyzes the configuration blockchain to identify a plurality of configuration records associated with a second Network Device 115 of the plurality of network devices. The method 700 continues to block 715, where, for at least one respective configuration record of the plurality of configuration records, the Blockchain Client 270 determines a respective configuration change reflected in the at least one respective configuration record, and implements the respective configuration change on the first Network Device 115.

Figure 8:
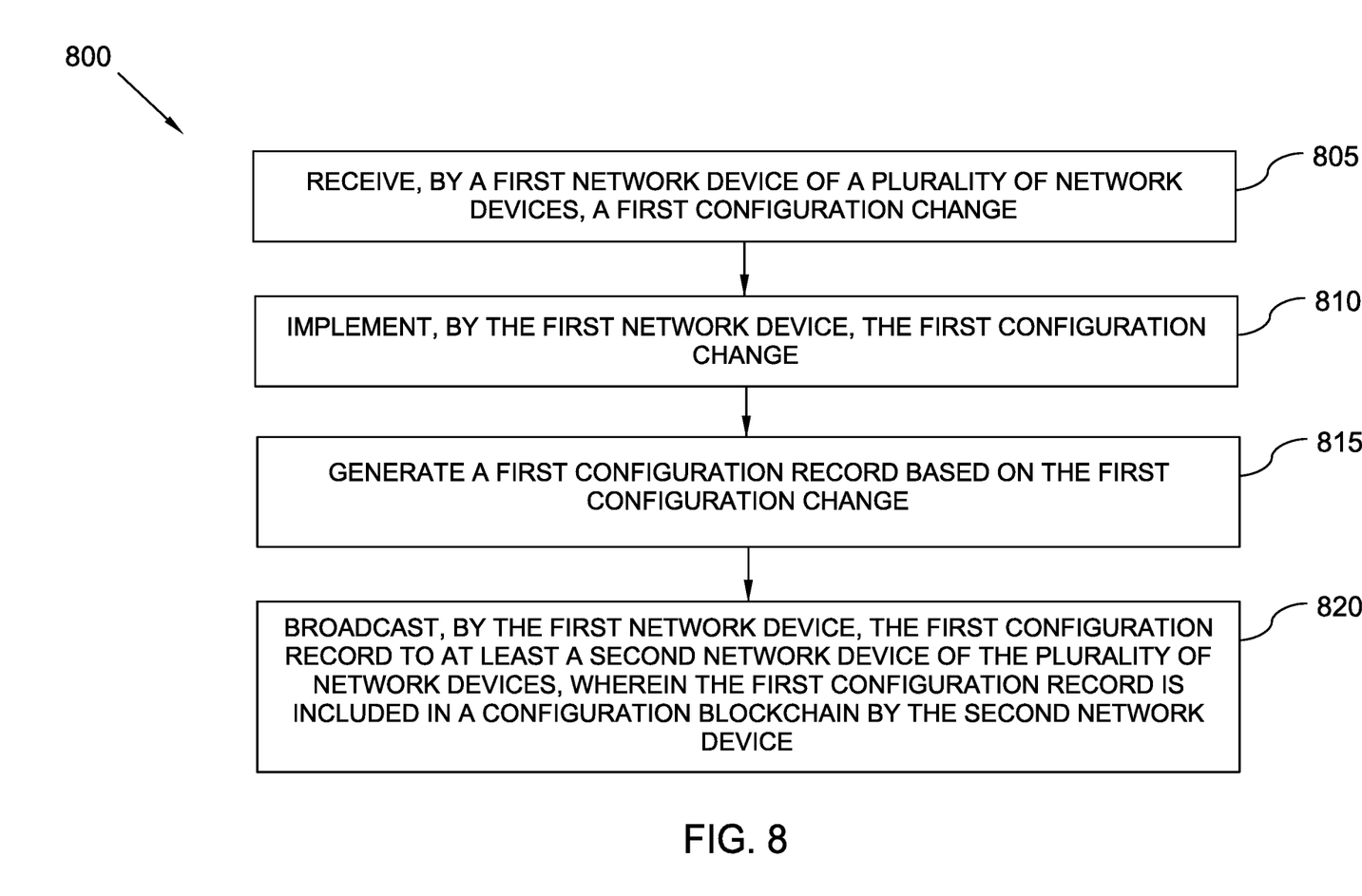
FIG. 8 is a flow diagram illustrating a method of utilizing a configuration blockchain, according to one embodiment disclosed herein.

FIG. 8 is a flow diagram illustrating a method 800 of utilizing a configuration blockchain, according to one embodiment disclosed herein. In the illustrated embodiment, the method 800 begins at block 805, where a Configuration Blockchain Client 270 of a first Network Device 115 of a plurality of network devices receives a first configuration change. At block 810, the first Network Device 115 implements the first configuration change. The method 800 then proceeds to block 815, where the Blockchain Client 270 generates a first configuration record based on the first configuration change. Finally, at block 820, the Blockchain Client 270 broadcasts the first configuration record to at least a second Network Device 115 of the plurality of network devices, wherein the first configuration record is included in a configuration blockchain by the second Network Device 115.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Controller Application 230 or the Configuration Blockchain 275) or related data available in the cloud. For example, a Configuration Blockchain Client 270 could execute on a computing system in the cloud and track the configuration updates to a network. In such a case, the Configuration Blockchain Client 270 could generate and validate configuration records, and store the Configuration Blockchain 275 at a storage location in the cloud. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
receiving, by a first network device of a plurality of network devices, a configuration blockchain;
receiving an instruction to replicate a configuration of a second network device of the plurality of network devices;
analyzing, by the first network device, the configuration blockchain to identify a plurality of configuration records reflecting configuration changes made to the second network device; and
for at least one respective configuration record of the plurality of configuration records:
determining, by the first network device, a respective configuration change specified in the at least one respective configuration record;
implementing, by the first network device, the respective configuration change on the first network device by updating a configuration of the first network device based on the respective configuration change; and
subsequent to implementing the respective configuration change, recording the respective configuration change in the configuration blockchain.

2. The method of claim 1, further comprising:
receiving, by the first network device, a first configuration change;
implementing, by the first network device, the first configuration change; and
broadcasting, by the first network device, a first configuration record to at least a third network device of the plurality of network devices, wherein the first configuration record is included in the configuration blockchain by the third network device.

3. The method of claim 1, further comprising:
receiving, by the first network device, a second configuration record; and
adding the second configuration record to a configuration ledger.

4. The method of claim 1, further comprising:
determining that a fourth network device of the plurality of network devices is being activated; and
transmitting the configuration blockchain to the fourth network device, wherein the fourth network device implements one or more configuration changes based on the configuration blockchain.

5. The method of claim 1, wherein analyzing the configuration blockchain to identify configuration records associated with the second network device is performed upon determining, by the first network device, that the first network device is to replace the second network device in a network.

6. The method of claim 1, wherein each of the plurality of configuration records are signed with a secure unique device identification (SUDI) certificate associated with the second network device.

7. The method of claim 1, wherein the configuration blockchain is maintained by at least two of the plurality of network devices, wherein the plurality of network devices is maintained by a first enterprise.

8. The method of claim 1, wherein the plurality of network devices operate on a private software-defined network.

9. A computer program product comprising:
a computer-readable storage medium having computer-readable program code embodied therewith, the computer-readable program code executable by one or more computer processors to perform an operation comprising:
receiving, by a first network device of a plurality of network devices, a configuration blockchain;
receiving an instruction to replicate a configuration of a second network device of the plurality of network devices;
implementing, by the first network device, a first configuration change specified in the configuration blockchain and associated with the second network device by updating a configuration of the first network device based on the first configuration change;

subsequent to implementing the first configuration change, generating a first configuration record based on the first configuration change to reflect that the first configuration change was made to the first device;

recording the first configuration record in a configuration blockchain; and broadcasting, by the first network device, the first configuration record to one or more other network devices of the plurality of network devices, wherein the one or more other network devices add the first configuration record to the configuration blockchain.

10. The computer program product of claim 9, the operation further comprising:

for each respective configuration record of the plurality of configuration records:

determining, by the first network device, a respective configuration change reflected in the at least one respective configuration record; and implementing, by the first network device, the respective configuration change on the first network device.

11. The computer program product of claim 9, the operation further comprising:

receiving, by the first network device, a second configuration record; and adding the second configuration record to a configuration ledger.

12. The computer program product of claim 9, the operation further comprising:

determining that a fourth network device of the plurality of network devices is being activated; and transmitting the configuration blockchain to the fourth network device, wherein the fourth network device implements one or more configuration changes based on the configuration blockchain.

13. The computer program product of claim 9, wherein analyzing the configuration blockchain to identify configuration records associated with the second network device is performed upon determining, by the first network device, that the first network device is to replace the second network device in a network.

14. The computer program product of claim 9, wherein the first configuration record is signed with a secure unique device identification (SUDI) certificate associated with the first network device.

15. A system comprising:

one or more computer processors; and a memory containing a program which when executed by the one or more computer processors performs an operation, the operation comprising:

receiving, by a first network device of a plurality of network devices, a configuration blockchain;

receiving an instruction to replicate a configuration of a second network device of the plurality of network devices;

analyzing, by the first network device, the configuration blockchain to identify a plurality of configuration records reflecting configuration changes made to the second network device; and for at least one respective configuration record of the plurality of configuration records:

determining, by the first network device, a respective configuration change specified in the at least one respective configuration record;

implementing, by the first network device, the respective configuration change on the first network device by updating a configuration of the first network device based on the respective configuration change; and subsequent to implementing the respective configuration change, recording the respective configuration change in the configuration blockchain.

16. The system of claim 15, the operation further comprising:

receiving, by the first network device, a second configuration record; and adding the second configuration record to a configuration ledger.

17. The system of claim 15, the operation further comprising:

determining that a fourth network device of the plurality of network devices is being activated; and transmitting the configuration blockchain to the fourth network device, wherein the fourth network device implements one or more configuration changes based on the configuration blockchain.

18. The system of claim 15, wherein analyzing the configuration blockchain to identify configuration records associated with the second network device is performed upon determining, by the first network device, that the first network device is to replace the second network device in a network.

19. The system of claim 15, wherein each of the plurality of configuration records are signed with a secure unique device identification (SUDI) certificate associated with the second network device.

20. The system of claim 15, wherein the configuration blockchain is maintained by at least two of the plurality of network devices, wherein the plurality of network devices is maintained by a first enterprise.

* * * * *

UNITED STATES PATENT AND TRADEMARK OFFICE
CERTIFICATE OF CORRECTION

PATENT NO. : 11,044,156 B2  
APPLICATION NO. : 16/112418  
DATED : June 22, 2021  
INVENTOR(S) : Scott M. Saltsgaver et al.

Page 1 of 1

It is certified that error appears in the above-identified patent and that said Letters Patent is hereby corrected as shown below:

In the Drawings

On sheet 2 of 8, in Figure 2, reference numeral 230, Line 1, delete "APPLICATOIN" and insert -- APPLICATION --, therefor.

On sheet 6 of 8, in Figure 6, reference numeral 620, Line 2, delete "CONFIGURAITON" and insert -- CONFIGURATION --, therefor.

In the Specification

In Column 3, Line 29, delete "1108," and insert -- 110B, --, therefor.

In Column 3, Line 62, delete "1106" and insert -- 110B --, therefor.

In Column 3, Line 66, delete "1106" and insert -- 110B --, therefor.

In Column 4, Line 11, delete "1106." and insert -- 110B. --, therefor.

In Column 4, Line 39, delete "1108," and insert -- 110B, --, therefor.

In Column 7, Line 55, delete "the a" and insert -- a --, therefor.

In Column 7, Line 58, delete "the a" and insert -- a --, therefor.

In Column 8, Line 34, delete "SUDI) certificate" and insert -- SUDI certificate) --, therefor.

In Column 9, Line 13, delete "1158" and insert -- 115B --, therefor.

Signed and Sealed this  
Twenty-fourth Day of August, 2021

Drew Hirshfeld  
*Performing the Functions and Duties of the  
Under Secretary of Commerce for Intellectual Property and  
Director of the United States Patent and Trademark Office*